Feb. 3, 1931. H. A. WINTERMUTE 1,791,338
ELECTRICAL PRECIPITATOR
Filed April 12, 1927 11 Sheets-Sheet 1
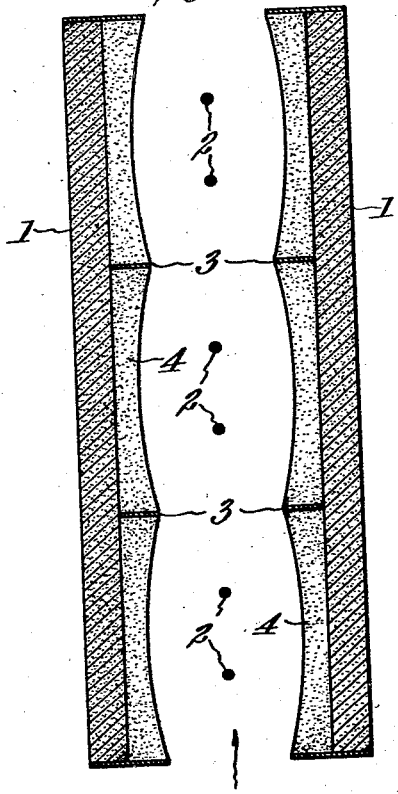
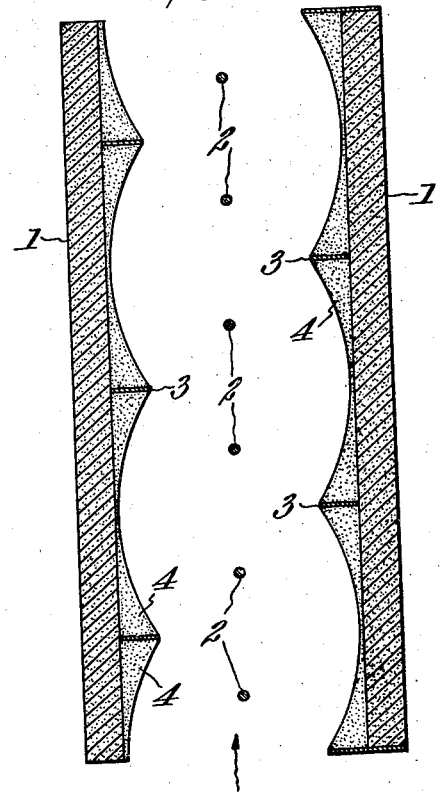
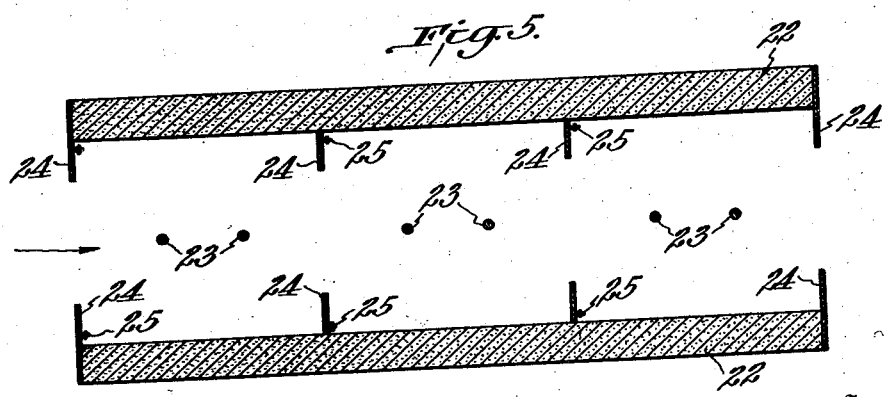
Inventor:
Harry A. Wintermute,
By Byrnes Townsend & Brickenstein
Attorneys.

Feb. 3, 1931.  H. A. WINTERMUTE  1,791,338
ELECTRICAL PRECIPITATOR
Filed April 12, 1927   11 Sheets-Sheet 2
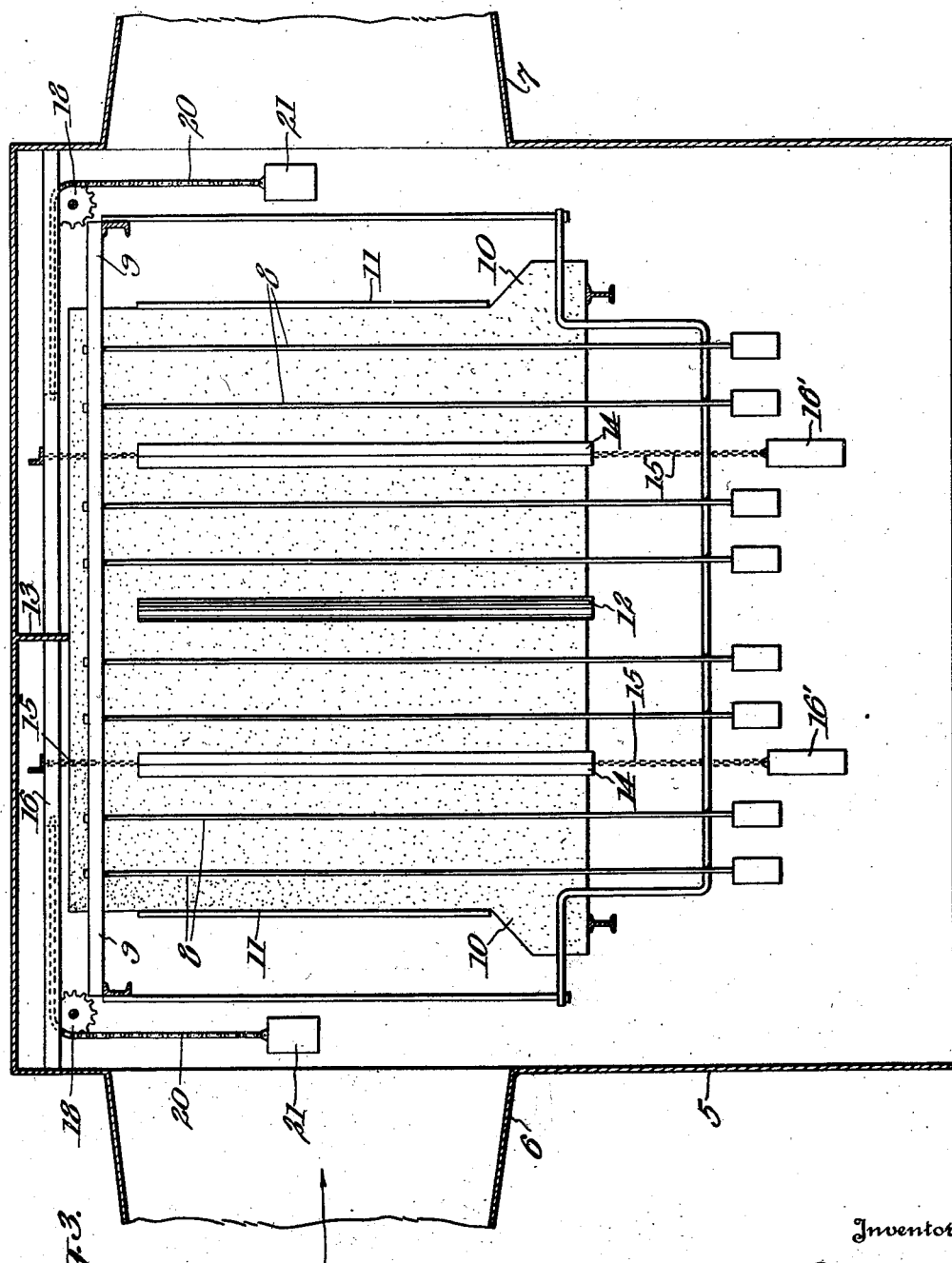

Feb. 3, 1931.     H. A. WINTERMUTE     1,791,338
ELECTRICAL PRECIPITATOR
Filed April 12, 1927     11 Sheets-Sheet 3
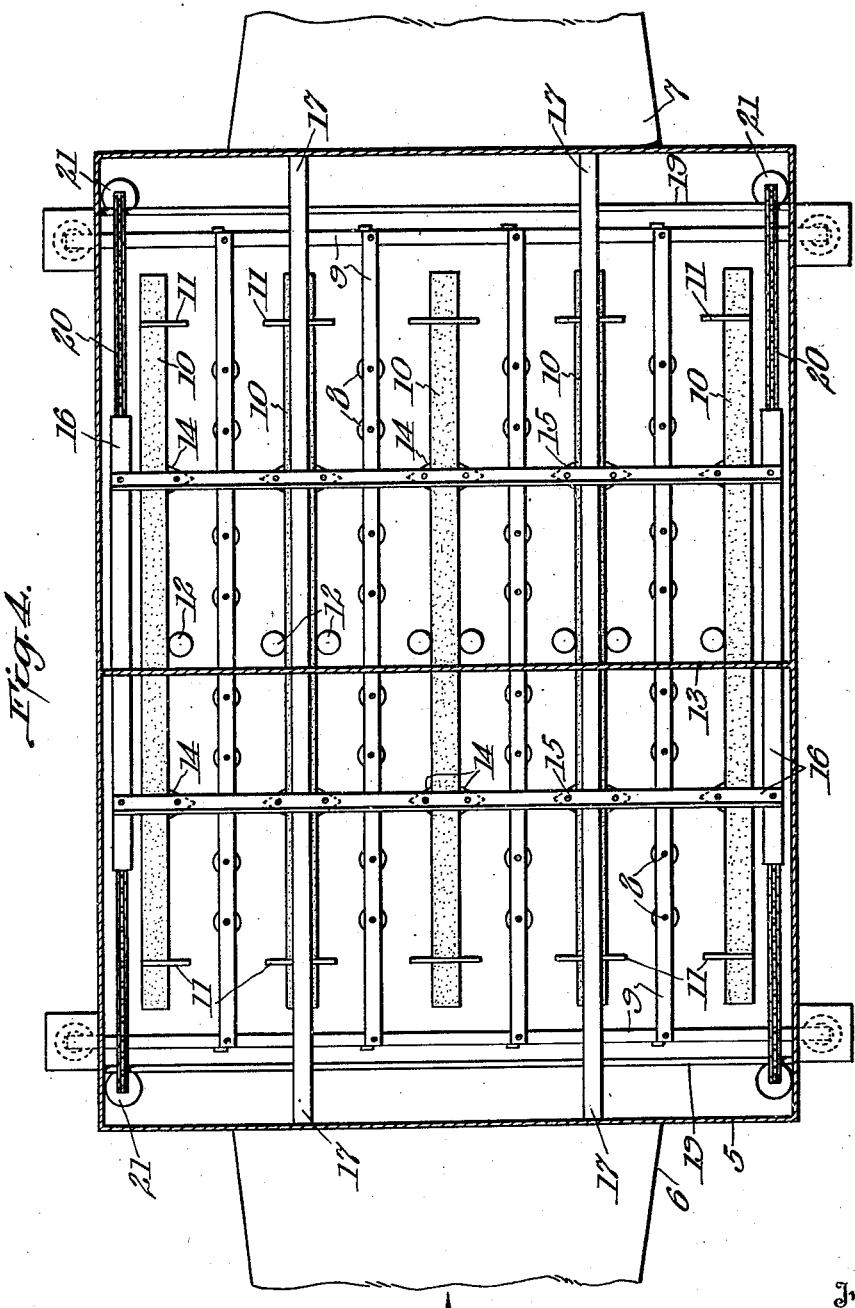
Inventor:
Harry A. Wintermute,
By Byrnes Townsend & Brickenstein,
Attorneys.

Feb. 3, 1931. H. A. WINTERMUTE 1,791,338
ELECTRICAL PRECIPITATOR
Filed April 12, 1927 11 Sheets-Sheet 5
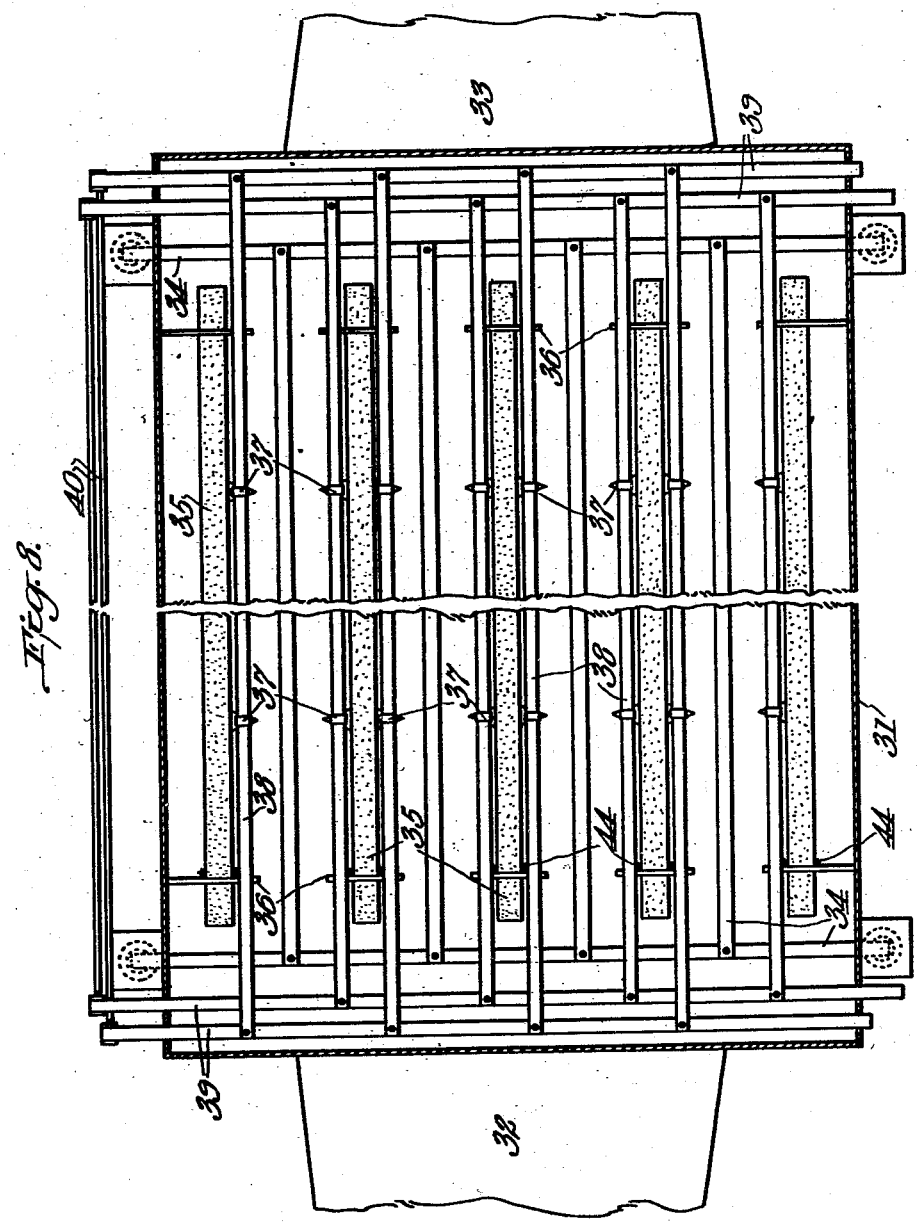

Feb. 3, 1931. H. A. WINTERMUTE 1,791,338
ELECTRICAL PRECIPITATOR
Filed April 12, 1927 11 Sheets-Sheet 6
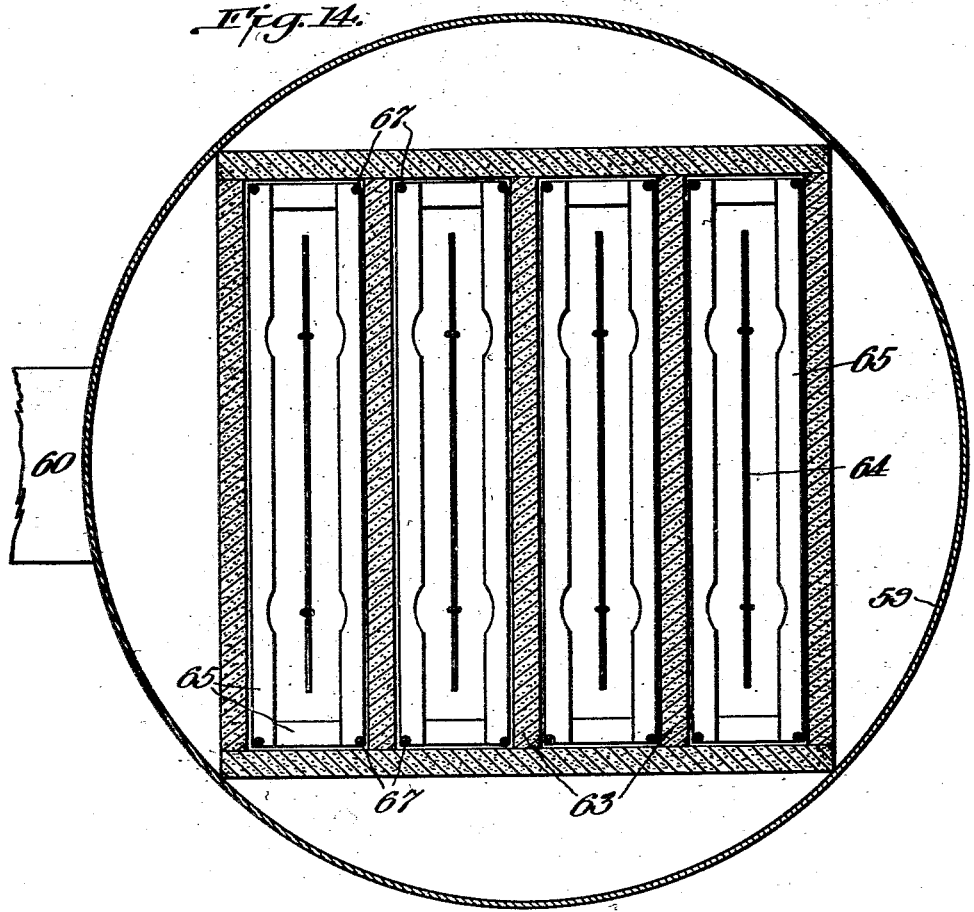
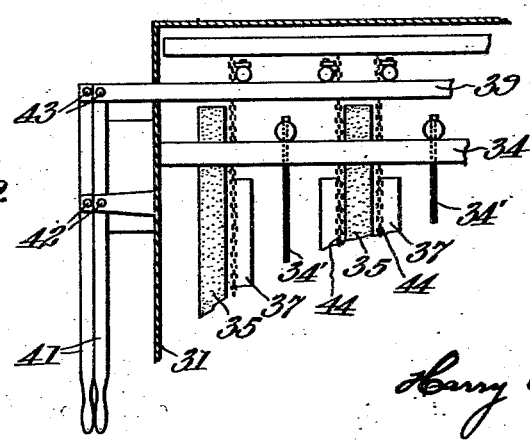

Feb. 3, 1931.  H. A. WINTERMUTE  1,791,338
ELECTRICAL PRECIPITATOR
Filed April 12, 1927  11 Sheets-Sheet 7
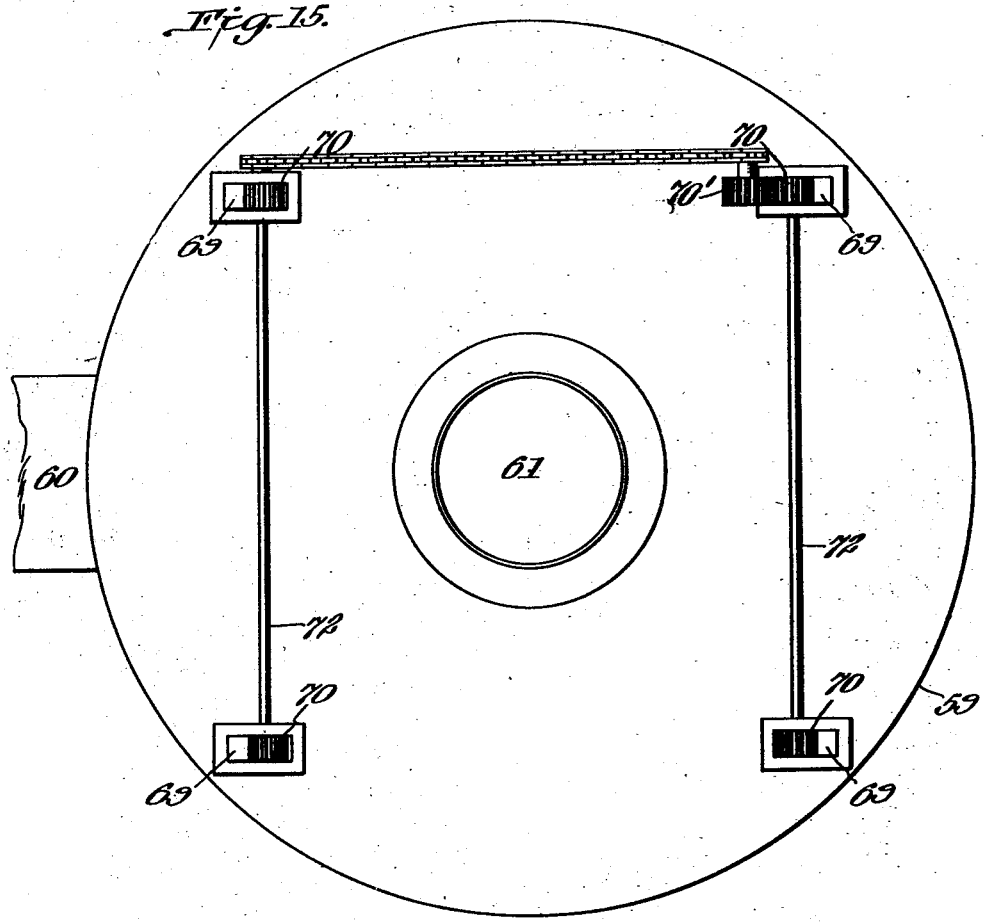
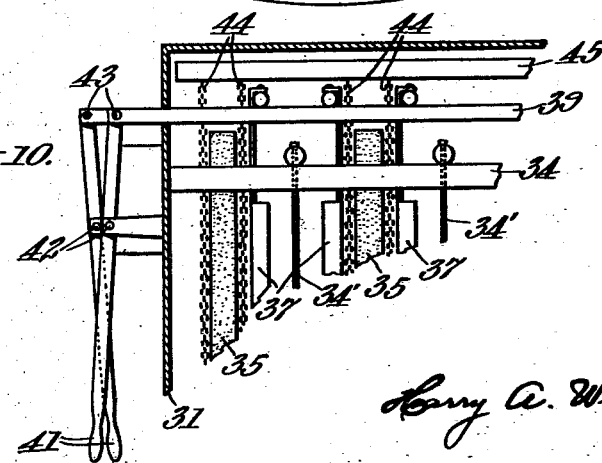

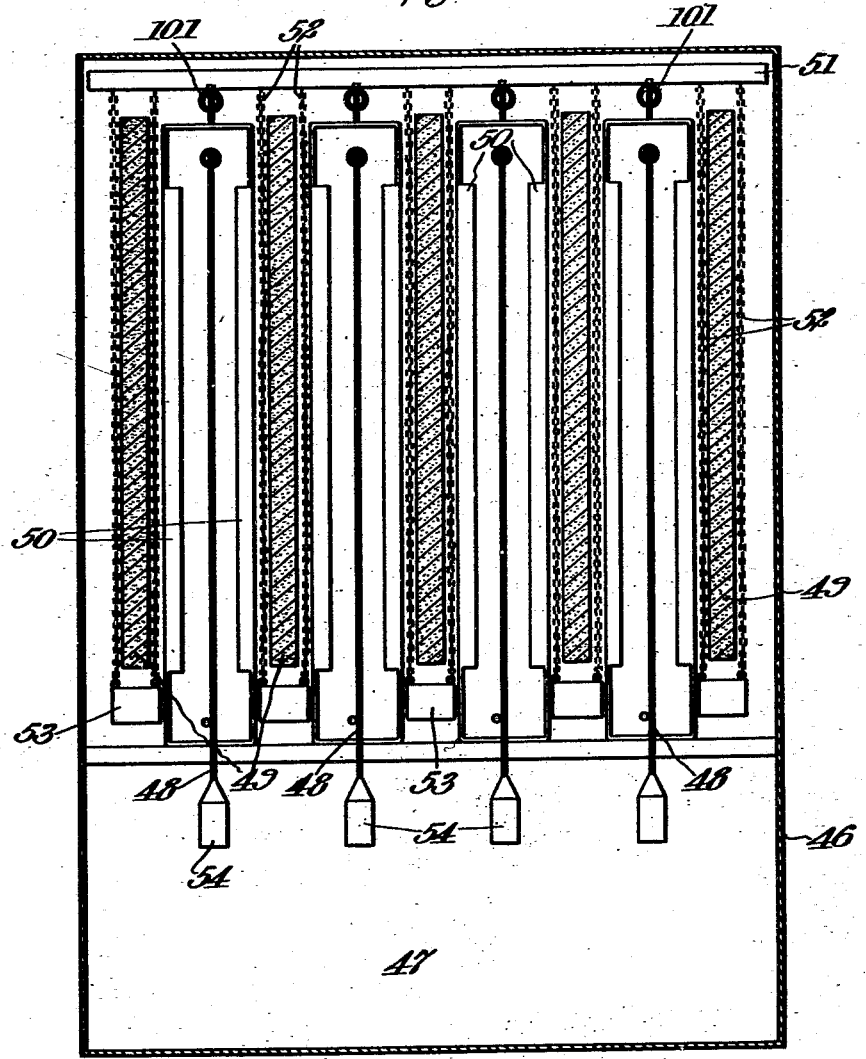

Feb. 3, 1931.  H. A. WINTERMUTE  1,791,338
ELECTRICAL PRECIPITATOR
Filed April 12, 1927   11 Sheets-Sheet 9
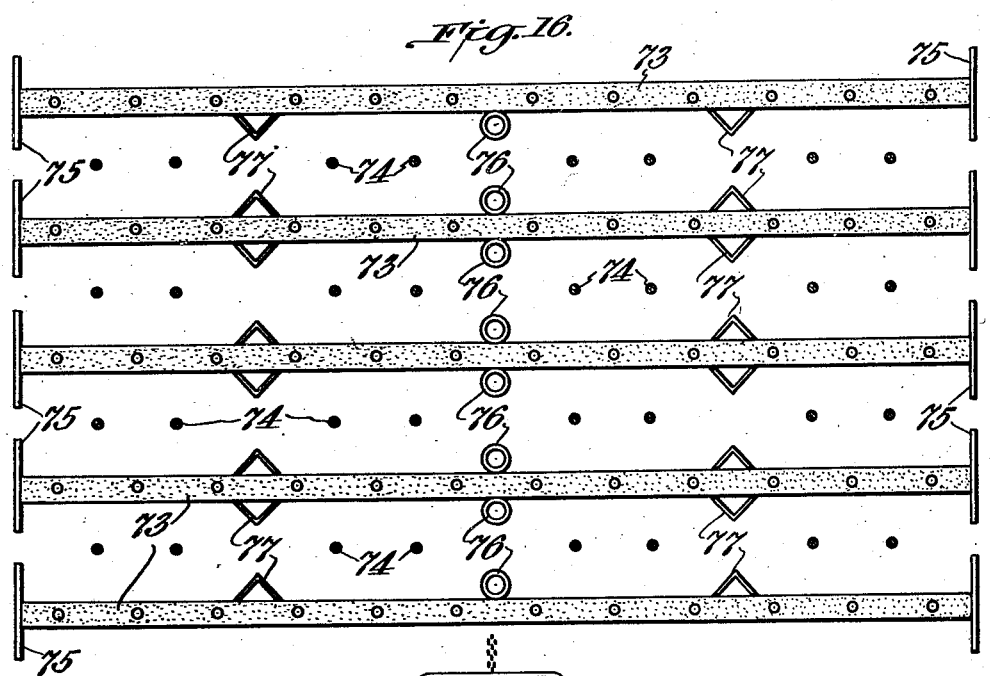
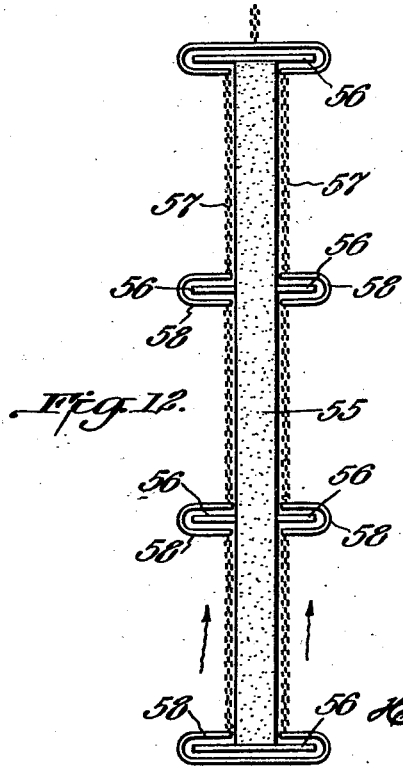
Inventor:
Harry A. Wintermute,
By Byron Townsend Brickenstein,
Attorneys.

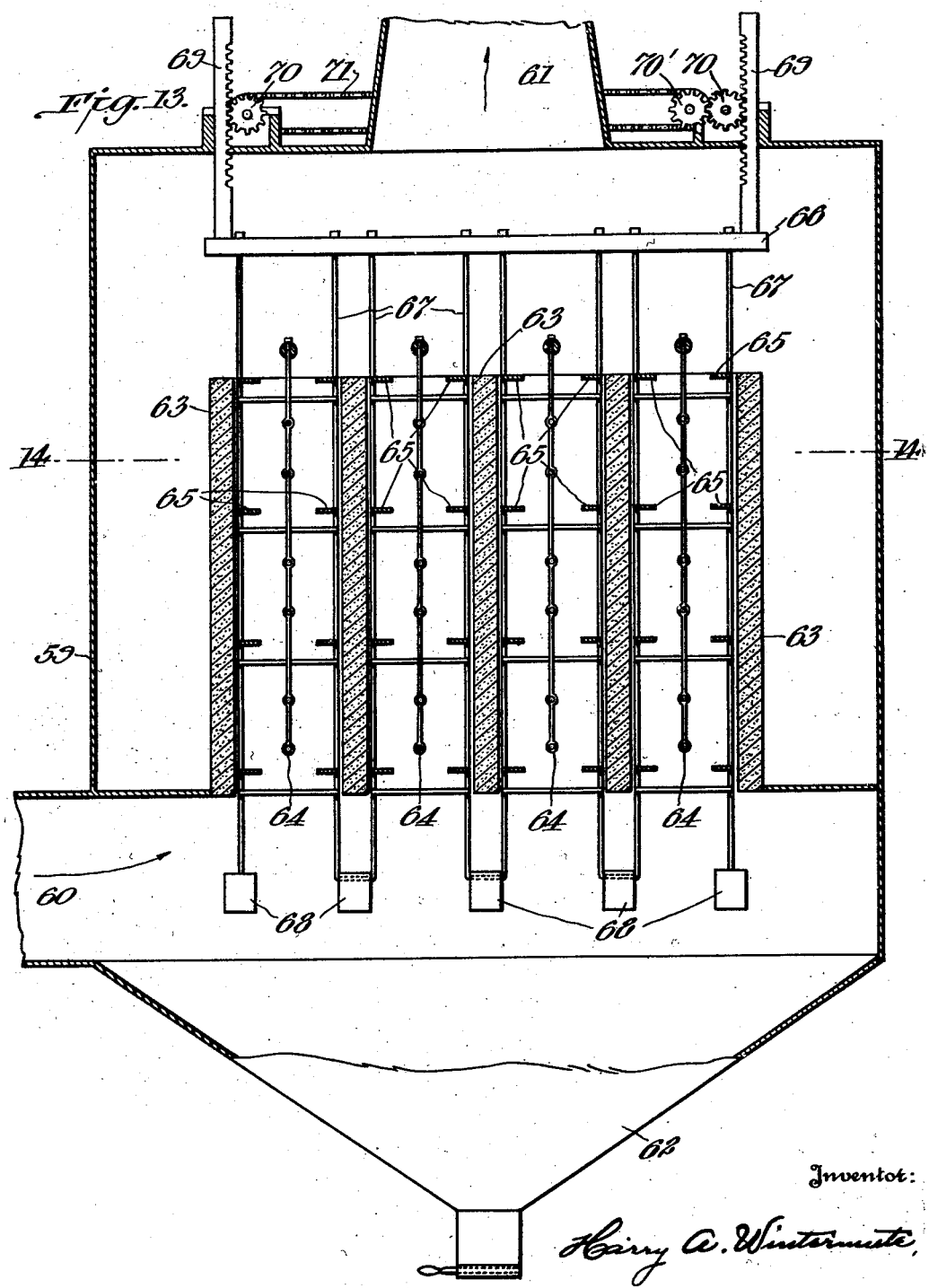

Feb. 3, 1931.  H. A. WINTERMUTE  1,791,338
ELECTRICAL PRECIPITATOR
Filed April 12, 1927   11 Sheets-Sheet 11
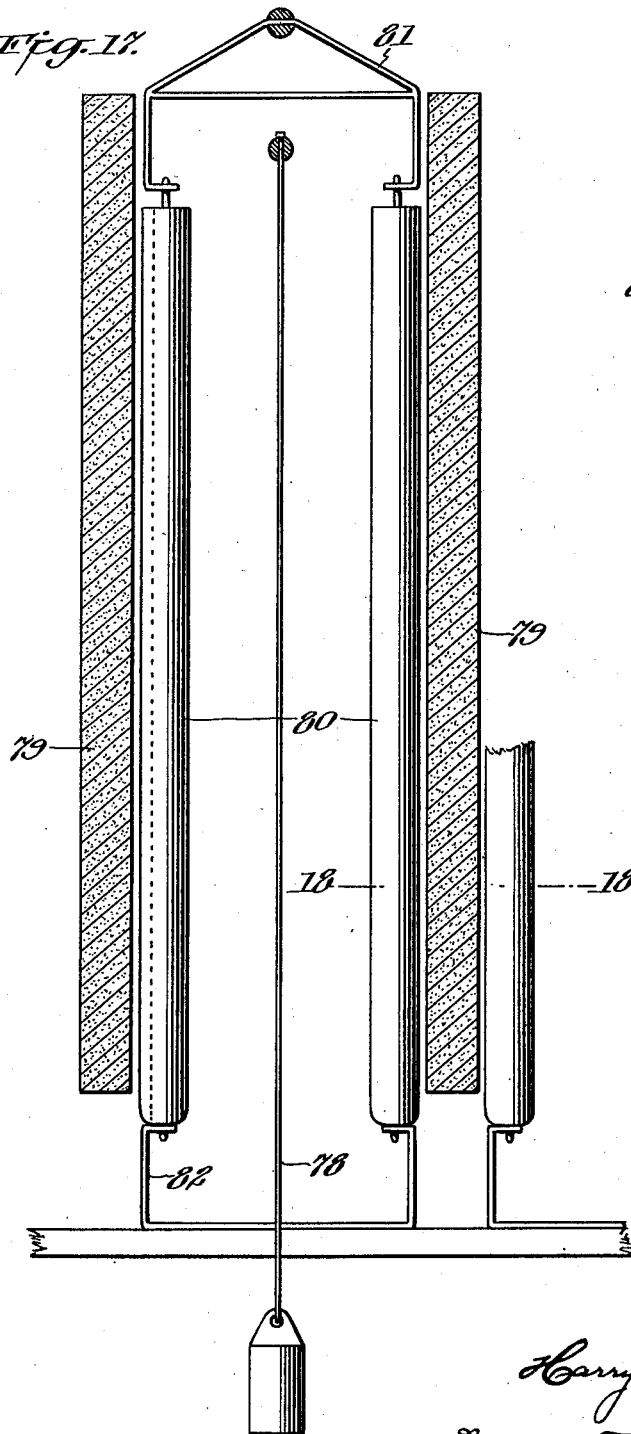
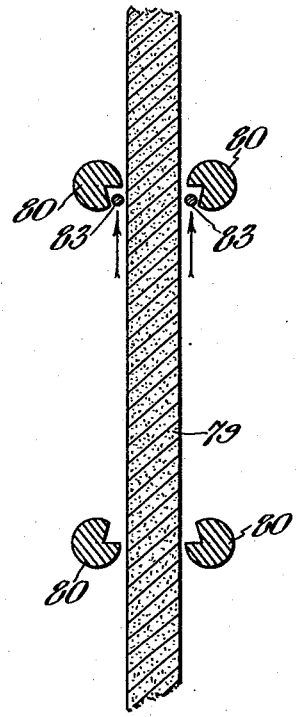

Patented Feb. 3, 1931

1,791,338

UNITED STATES PATENT OFFICE

HARRY A. WINTERMUTE, OF PLAINFIELD, NEW JERSEY, ASSIGNOR TO RESEARCH CORPORATION, OF NEW YORK, N. Y., A CORPORATION OF NEW YORK

ELECTRICAL PRECIPITATOR

Application filed April 12, 1927. Serial No. 183,138.

This invention relates to the separation of suspended material from gases by passing them between discharge and collecting electrodes which are maintained at high electrical potential difference, in such manner that the suspended material carried by the gases is deposited or collected to a greater or less extent on such electrodes.

One object of my invention is to provide a path for the gases having pockets or "dead" areas wherein the particles precipitated from the suspended material are collected and can fall to the collecting bin without becoming resuspended in the gas.

Another object is to provide quiet or "dead" zones adjacent the collecting electrodes whereby light or fluffy materials or materials in which there is slight cohesion between individual particles may be collected and dropped to the collecting bin without being re-suspended and thus carried forward by the gas flow.

Another object is to provide such pockets by means of baffles mounted adjacent the collecting electrodes and providing scrapers to remove the accumulated particles from the pockets.

A further object is to make such baffles movable so that they may be used as scrapers or that scraping means may pass between them and the collecting electrodes to remove accumulated dust particles.

A further object is to provide baffles spaced from the electrodes so that scraping means may pass between them and the electrode.

A further object is to provide baffles of a simple construction which are easy to install in existing precipitators and also for application to precipitators of the concrete plate type.

These and other objects will be apparent from the following description taken in connection with the accompanying drawings wherein Figs. 1 and 2 are explanatory diagrams showing in top plan view, two forms of precipitator constructions including quiet zones for the deposition of precipitated matter.

Fig. 3 is a side view in section of a precipitator with movable and fixed baffles;

Fig. 4 is a top plan of Fig. 3;

Fig. 5 shows an arrangement of baffles similar to Fig. 1, with scraping means therewith;

Fig. 8 is a top plan of a modification in which means are shown for moving the baffles.

Fig. 9 is a detail in elevation of Fig. 8 showing the means for moving the baffles away from the collecting electrodes.

Fig. 10 is a similar view with the baffles moved to the cleaning position.

Fig. 11 shows a modification wherein the baffles are permanently spaced from the collecting electrodes;

Fig. 12 shows fixed baffles with loops in the scraper chains around the same.

Fig. 13 shows a vertical section of one precipitator section wherein the baffles are movable to thereby act as scrapers.

Fig. 14 is a horizontal section on line 14—14 of Fig. 13.

Fig. 15 shows the moving means for the baffles shown in Figs. 13 and 14.

Fig. 16 shows in section an arrangement combining fixed and movable baffles.

Fig. 17 is a vertical section of a modified form of baffles which are rotatable and Fig. 18 is a detail thereof.

Figure 6:
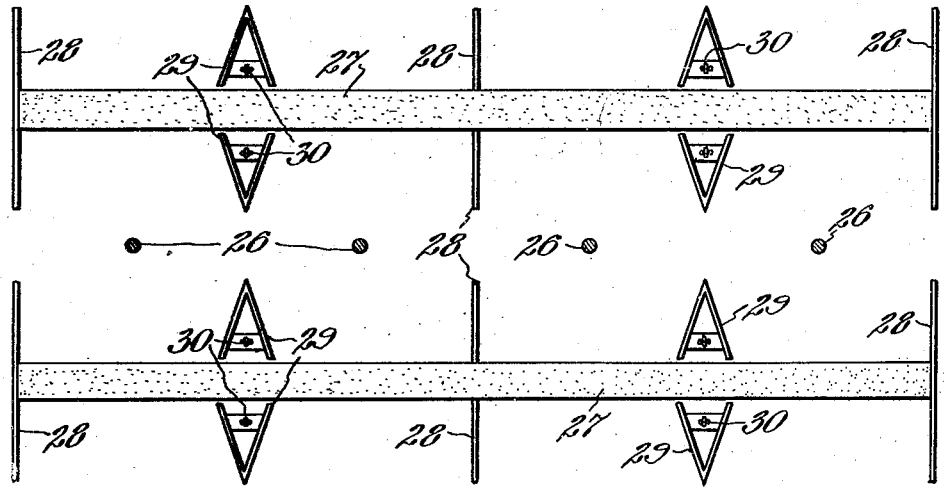
Fig. 6 is another top plan showing combined fixed and movable baffles.

In carrying out my invention I employ baffles located on the collecting electrodes, the use of such baffles being described in U. S. Patent No. 1,343,482 to Schmidt and Roberts, patented June 15, 1920.

Referring to Figs. 1 and 2, there are shown collecting electrodes 1, between which the discharge electrodes 2 are placed. The baffles are indicated at 3. It will be noted that in Fig. 1 the baffles are placed opposite one another on the electrodes and the discharge electrode between them is omitted. The suspended material is then precipitated on the collecting electrodes and shielded in the areas, as indicated by numeral 4, from the gas flow, as indicated by the arrow.

By an arrangement of baffles in Fig. 1, quiet zones are provided adjacent the collecting electrodes within which the material collects. When this collected material builds out to a sufficient depth, it loosens by its own weight from the electrodes and falls to a collecting bin but remaining within the quiet zone between baffles. To accomplish this result the sides of the pockets are extended sufficiently, in addition to the distance the dust builds out, to furnish it complete protection. The areas designated by numeral 4 are the total protected zone, consisting of the portion built out with precipitate and that necessary to furnish protection to the falling dust. The falling material is not, therefore, disintegrated and re-suspended in the moving gases.

The depth of pockets and their spacing is influenced somewhat by the character of the precipitate, some materials building out to a greater depth before falling than others. The volume of gas that can be treated also depends upon the depth and spacing of the pockets. It has been found by actual experiment that higher recoveries can be secured when the pockets are deep and the sides relatively close together. In tests conducted on one type of precipitate, the pockets were two inches deep and eighteen inches wide. The dust built out on an average of one half inch before dropping. As can readily be seen, quiet zones are relatively more effective where the plates are very high than where they are low.

It has also been found advantageous to extend the quiet zones provided by the baffles well down below the lowest point of gas movement, when the baffles are arranged vertically. Otherwise the precipitated matter which has been loosened from the collecting electrodes by reason of its own weight or by mechanical scraping will be picked up by the moving gases and carried on out of the precipitator. One way to extend the quiet zones is to have the vertical baffles extend down below the normal path of movement of the gases, even extending down into the receiving hopper for the precipitate in some cases.

By the arrangement of Fig. 2, wherein like reference numerals designate similar parts, the baffles are arranged in staggered relation on opposite electrodes. The gas therefore has a sweeping effect, from one collecting electrode to the other, and the desired protection is lost.

In Figs. 3 and 4, there is shown a complete precipitator unit. The outer shell 5 has the inlet 6 for the gas and the outlet 7. The discharge electrodes 8 are carried by the high-tension frame 9 between collecting electrodes 10. As will be seen from Fig. 4, certain of the discharge electrodes have been omitted and baffles placed on the collecting electrodes similar to the arrangement of Fig. 1.

Due to a relatively slow building up of a permanent hard precipitate between baffles which will not break loose and fall, as does the bulk of the precipitate, it is necessary to remove this deposit from time to time, thus preventing the formation of high spots on which a corona discharge might concentrate. When such concentration takes place, there are large areas where the corona discharge is very low. Such conditions give very low recoveries of suspended material. Due to this condition, it is necessary to remove this hard precipitate in order to maintain an even corona discharge and so secure a high percentage of recovery. Scraping the collecting electrodes has been found to be an effective method of removing the hard precipitate, and for this purpose, various means are provided in this invention.

Referring again to Figs. 3 and 4, the baffles themselves are used as scraping means. In this modification, a combination of fixed and movable or scraping baffles are used. Near the entrance end 6 and exit end 7 each collecting electrode carries a stationary baffle 11. About midway of the electrode, another set of stationary baffles 12 are shown, which are here shown as circular in cross-section though other shapes may be used. Arranged across the top of the unit is a deflecting plate or baffle 13. Movable baffles 14 are supported on chains 15 from a frame 16, the chains having weights 16' thereon. These baffles are here shown as triangular in cross-section, though other shapes may be used. The frame 16 is capable of being reciprocated to thereby move the movable baffles back and forth between the stationary baffles, whereby the collected hard precipitate may be scraped free of the electrode when cleaning is required. Frame 16 rests on and is supported by rigid supporting members 17, carried by the precipitator shell 5. Sprocket wheels 18 supported on shafts 19 engage chains 20, which chains are attached to frame 16 at one of their ends and carry weights 21 at their other ends. Any means, either manual, mechanical or electrical, may be used to move the reciprocable frame 16 to thereby scrape baffles 14 along the collecting electrodes and loosen the hard precipitate which can then fall to the hopper below. It will be noted that the falling materials drop to the hopper through a quiet zone where the gas velocity is very low and thus there will be very slight interference. It will be clear therefore that falling of the precipitate takes place without shutting off the gas flow.

It will be understood that other precipitator units may be arranged in connection with that shown in Figs. 3 and 4, such that the gas will pass successively through a multiplicity of units.

In Fig. 5, there is shown another method of cleaning the electrodes. In this figure, the collecting electrodes are marked 22, the discharge electrodes 23 and the stationary baffles 24. These baffles are fixed to the collecting electrodes and auxiliary means are provided for cleaning the plates, consisting of chains 25 resting against the electrodes and normally positioned as shown in Fig. 5. These chains may be carried by a frame similar to the baffle carrying frame 16 of Figs. 3 and 4, whereby the chains may be moved to scrape the electrodes between baffles, there being one chain between adjacent stationary baffles.

Figure 7:
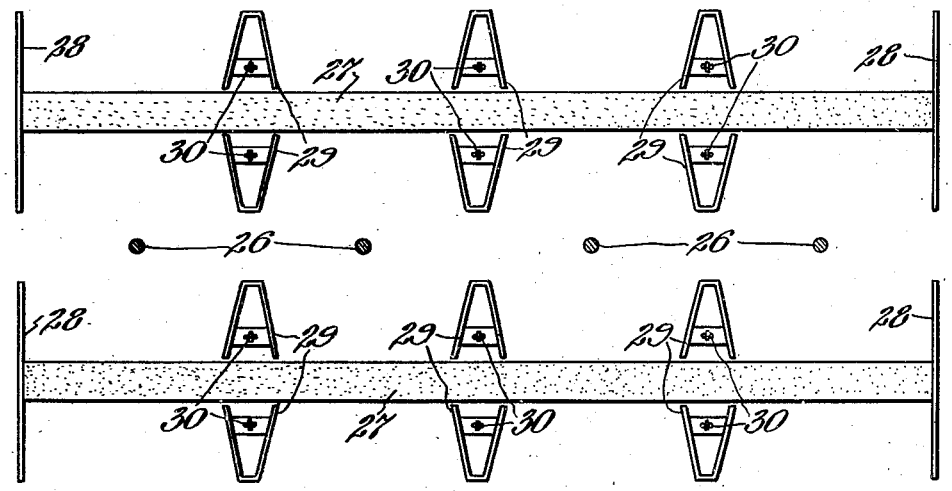
Fig. 7 is a similar view of a modification.

In Figs. 6 and 7, various forms of baffles and arrangements thereof are shown. The discharge electrodes 26 are positioned between the collecting electrodes 27. In Fig. 6, each collecting electrode carries alternate stationary and movable baffles the stationary baffles being designated 28, and the movable ones 29. The movable baffles are supported by chains 30 from any suitable movable frame, such as frame 16 in Figs. 3 and 4. In Fig. 7, stationary baffles 28 are placed at the ends of the collecting electrodes and all the intervening baffles 29 are movable by chains 30. In these figures the movable baffles are shown as having different cross-sections. It will be understood that the invention is not limited to these shapes but other forms may be used.

Referring to Fig. 8, which is a section looking down into a precipitator unit of the horizontal flow type, numeral 31 indicates the shell, 32 and 33 the inlet and exit for gases. The discharge electrodes as shown in Figs. 9 and 10 are suspended from the frame 34 between the collecting plates 35. In this modification, there is provided a set of baffles which may be moved from their normal position against the collecting electrodes to a separated position, thus leaving a space between them and the plates, to allow cleaning or scraping means to pass back of the baffles. To this end, the collecting electrodes each have a stationary baffle 36 at each end, and movable baffles 37 suspended from overhead bars 38. Each collecting electrode has two bars 38 with their depending baffles 37, one on each side thereof, except the two end collecting electrodes, where only the inner bar and baffles are provided. Bars 38 project beyond the ends of collecting electrodes 35 and are connected to and carried by supporting rods 39. These supporting rods pass through the precipitator shell 31 and are themselves supported by the shell for reciprocating movement.

There are two supporting rods 39 at each end of the unit and all bars 38 and baffles 37 which are to move in one direction for cleaning are connected to one supporting rod 39 and those which are to move in the opposite direction are connected to the other support 39. By these connections, the baffles 37 may be moved away from the collecting electrodes as a unit, whereby cleaning means 44 may be passed between them and the plate or electrode. This operation will be clear from an inspection of Figs. 9 and 10. In Fig. 9, the baffles are shown against the electrodes, and in Fig. 10 they are shown as moved out for cleaning to take place. Bars 39 at both ends of the unit are cross connected outside the unit shell by members 40, so that both ends will move in unison. For moving bars 39, handles 41 are pivoted to shell 31 at 42 and connected to bars 39 at 43. By simply moving the handles in opposite directions from the position shown in Fig. 9 to that of Fig. 10, the baffles will be moved to cleaning position.

The lower ends of the baffles may be weighted as shown in Fig. 3 or they may be also rigidly connected together by a frame similar to that used at the upper end. Referring to Figs. 9 and 10, the cleaning chains 44 are suspended from a carrier 45, which may be similar to that shown in Fig. 3, whereby these chains may be scraped along both faces of the collecting electrodes when the baffles are moved out.

In Fig. 11, there is shown a precipitator unit wherein the baffles are permanently separated a slight distance from the plates, to allow the scraping means to pass back of them. Numeral 46 indicates the precipitator shell, 47 the collecting bin for the precipitate, 48 the discharge electrode and 49 the collecting electrodes. The baffles 50 are shown as supported from rods 101 on which the scraper carrier 51 rides and spaced a slight distance from plates 49. Thus a scraping chain or other cleaning means may pass between the baffles and plate to break up any hard precipitate. These small openings back of the baffles are quickly sealed in use by the precipitated material, so that no leakage can occur back of the baffles. In this figure I have shown the cleaning chains 52 as carried by the same carrier which supports the baffles, but it will be clear that separate supporting means for the cleaning chains is within the purview of this invention. The cleaning chains or wires or rods are held taut by weights 53 at their lower ends, and weights 54 hold the discharge electrodes.

In Fig. 12, there is shown one application of the invention to a vertical flow precipitator. In this figure, the collecting electrode 55 has the baffles 56 mounted thereon. The cleaning chains 57 have loops 58 therein which pass around the baffles, when the chains are moved horizontally. By replacing the chains 57 with stiff members, this scheme of cleaning can be applied to a horizontal flow precipitator. By attaching lifting means similar to that shown on Fig. 13 and Fig. 15, to the end loops, the motion necessary for moving the scrapers can be secured.

Fig. 13 illustrates another type of vertical flow precipitator. The precipitator shell 59 has inlet 60 and outlet 61 for the gas and hopper 62 for the precipitate. Suspended between the collecting electrodes 63 are the discharge electrodes 64. Baffles 65 are suspended from a carrier 66 by rods 67. These baffles extend on all four sides of the rectangular openings defined by the collecting electrodes, as is clear from Fig. 14. In order to hold the rods and baffles tight against the collecting electrodes, weights 68 are attached to the lower ends of the rods. Movement of the baffles for scraping the plates is accomplished by providing upright racks 69 attached to the carrier 66 and having engagement with pinions 70. There are four racks 69, one at each corner of carrier 66, as illustrated in Fig. 15. Fig. 15 shows that four pinions are adapted for simultaneous rotation by a chain and gear connection 71 between common shafts 72, gears 70' being provided to mesh with gears 70 at the right side of Figs. 14 and 15 to give the same direction of movement to racks 69. Any suitable mechanism may be used to rotate gears 70 or 70'. It will be clear therefore that all the baffles may be raised and lowered as a unit to thereby break loose the hard precipitate.

In Fig. 16 there are illustrated combined movable and stationary baffles, which have been added to precipitators which did not have this improvement. The collecting electrodes are designated by numeral 73, and the discharge electrodes 74. Stationary end baffles 75 are mounted on the collecting plates and an intermediate stationary baffle 76. Midway between stationary baffles 75 and 76, the movable baffles 77 are mounted for scraping motion between the stationary baffles, thus cleaning the plates. The baffles thus added to an existing structure are placed on opposite sides of a discharge electrode which is then removed, thus making a saving in high tension equipment.

In Figs. 17 and 18 there is shown another form of movable baffle. In these views, the high tension discharge electrode 78 is suspended between collecting electrodes 79 in the usual manner. Mounted closely adjacent the collecting electrodes are baffles 80, which are rotatably supported above and below the collecting electrodes by means of supports 81 and 82. These baffles have a circular cross-section, with a notch cut therein, as clearly seen from Fig. 18 this notch extending their full length. Cleaning chains are shown by reference numeral 83. In use the cleaning chains are positioned at one end of the plates and the notches in the baffles 80 are all faced toward the chain. The precipitate soon builds up and prevents leakage back of the baffles, the opening being very small. In fact, it is perfectly feasible to allow the baffles to touch the plates, thus completely closing this opening. When it is necessary to clean the plates, the chains are dragged across them and enter each notch of the baffles as seen in Fig. 18, and rotate the baffle thus breaking loose the precipitate. A double mode of cleaning is thus obtained, since the chains act as scrapers and the baffles themselves break loose the precipitate by their rotation. The baffles will automatically face their notches toward the chains (see the lower baffles of Fig. 18).

In all of the modifications shown, it will be clear that a hopper is provided for collecting the precipitate which is loosened from the plates and falls, such as shown in Figs. 3, 11 and 13.

It will be understood that the modifications shown are by way of illustration only and not by way of limitation, and the invention is limited only as set forth in the following claims.

I claim:

1. In an electrical precipitator, the combination with discharge electrodes, collecting electrodes, and stationary baffles positioned adjacent the collecting electrodes, of additional baffles and means movably supporting said additional baffles adjacent to said collecting electrodes.

2. In an electrical precipitator, the combination with a collecting electrode, of baffles mounted adjacent to said collecting electrode, and means for moving said baffles over substantially the full collecting area of said collecting electrodes to remove precipitated material adhering thereto.

3. In an electrical precipitator, the combination with a casing, discharge electrodes and imperforate collecting electrodes within said casing, baffles positioned adjacent to said collecting electrodes to obstruct the gas stream, and a hopper at the lower end of said casing, said baffles providing a series of quiet zones extending the full height of said collecting electrodes and terminating adjacent said hopper, of means for scraping the collecting electrodes to clean them of precipitate, and means exterior of said casing for operating said scraping means.

4. In an electrical precipitator, in combination, discharge electrodes, collecting electrodes, and movable baffles mounted against said collecting electrodes, said baffles being suspended from a carrier frame, said carrier frame being independent of the discharge electrodes.

5. The structure as in claim 4 wherein the baffle carrier frame is bodily movable to cause a simultaneous scraping of the electrodes by the baffles.

6. In an electrical precipitator, in combination, discharge electrodes, collecting electrodes, and movable baffles on the collecting electrodes, said baffles being each connected to a carrier frame which is above and independent of the collecting electrodes, and being movable with said carrier.

7. In an electrical precipitator, the combination with a collector electrodes and a discharge electrode, of a pair of parallel baffles on said collector electrode and symmetrically arranged with respect to said discharge electrode, said baffles projecting from said collector electrode to such distance that they define a quiet zone of greater depth than that to which material will build upon the collector electrode before falling of its own weight, and means supporting one of said baffles for movement over the face of said collector electrode to remove adherent precipitated material therefrom.

8. In an electrical precipitator, the combination with a pair of parallel imperforate collector electrodes, a series of discharge electrodes between said collector electrodes, and a series of baffles on the respective collector electrodes defining quiet zones opposite the several discharge electrodes, the baffles projecting to such distance from the collector electrodes that the quiet zones are of greater depth than that to which material can build up therein before falling of its own weight, of means supporting certain of said baffles for movement to permit scraping of said collector electrodes to remove adherent precipitated material.

9. In an electrical precipitator, the combination with a collecting electrode, of a plurality of baffles mounted adjacent to said collecting electrode forming zones of dead gas areas therebetween and means for moving said baffles over substantially the full collecting area of said collecting electrode to remove precipitated material adhering between adjacent baffles.

10. In an electrical precipitator the combination with a collecting electrode, of baffles and means supporting said baffles for movement over the opposite surfaces of said collecting electrode.

11. In an electrical precipitator, in combination discharge electrodes, collecting electrodes, baffles positioned adjacent to the opposite surfaces of said collecting electrodes, and means for moving said baffles for cleaning simultaneously the opposite surfaces of the collecting electrodes.

12. In an electrical precipitator, in combination discharge electrodes, collecting electrodes, baffles opposingly mounted adjacent to opposing collecting surfaces, and means for moving said baffles for simultaneously cleaning opposing collecting surfaces.

13. In an electrical precipitator in combination discharge electrodes, collecting electrodes defining gas passageways, and a plurality of movable baffles mounted against the surfaces of the collecting electrodes, the baffles in each passageway being movably carried in spaced relationship with each other.

14. In an electrical precipitator, the combination with a collecting electrode, of pockets of dead gas areas formed along the surface thereof by baffles projecting from said collecting electrode, and scraping means for removing the precipitated material adhering in said pockets.

15. In an electrical precipitator, the combination with a collecting electrode, of baffles projecting from said collecting electrode, to form pockets of dead gas areas along the surface thereof, and means for moving said baffles for removing the precipitated material adhering in said pockets.

In testimony whereof, I affix my signature.

HARRY A. WINTERMUTE.